W. HARRISON.
INSECT TRAP.
APPLICATION FILED JUNE 26, 1912.

1,126,994.

Patented Feb. 2, 1915.

WITNESSES
G. M. Sprung
William Pinford

INVENTOR
William Harrison,
by Richard Bewer
his Attorney

UNITED STATES PATENT OFFICE.

WILLIAM HARRISON, OF FARMINGTON, NEW MEXICO.

INSECT-TRAP.

1,126,994.

Specification of Letters Patent.

Patented Feb. 2, 1915.

Application filed June 26, 1912. Serial No. 706,048.

*To all whom it may concern:*

Be it known that I, WILLIAM HARRISON, a citizen of the United States, residing at Farmington, in the county of San Juan and State of New Mexico, have invented new and useful Improvements in Insect-Traps, of which the following is a specification.

This invention relates to new and useful improvements in traps, and more particularly to an insect trap for catching flies and the like.

The primary object of the present invention relies in a device as aforesaid which may be easily and readily carried from place to place and manually operated.

Another object of this invention is to construct a device of the character described which is inexpensive in the cost of manufacture, strong, durable and efficient in use and which when operated will perform all the functions of such a device.

Other objects will appear hereinafter as the description continues.

With the above and other objects in view, this invention consists of the novel construction, combination, formation and arrangement of parts as will be hereinafter more fully described, claimed and particularly pointed out in the appended drawings, in which:—

Figure 1:
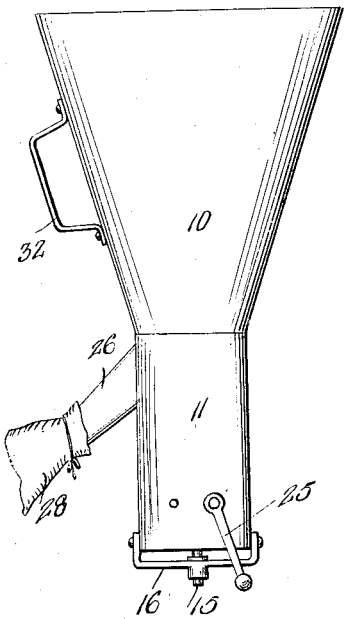
Figure 2:
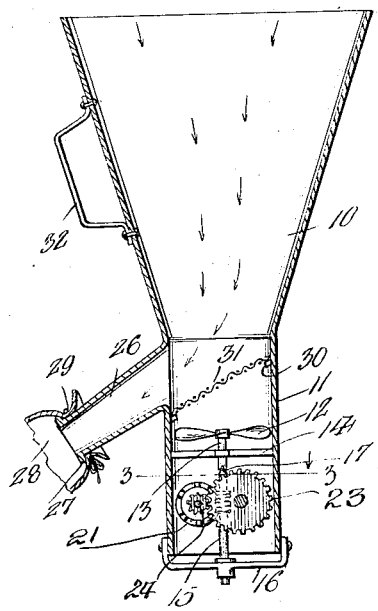
Figure 3:
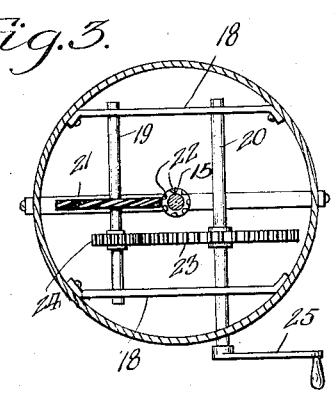
Figure 3:
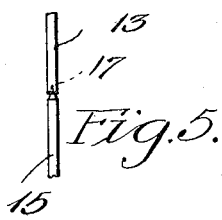
Figure 4:
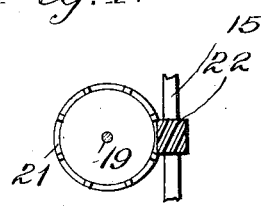

Figure 1 is a side elevation embodying my invention. Fig. 2 is vertical section through the same, and Fig. 3 is a transverse section taken on the line 3—3 of Fig. 2. Fig. 4 is a detailed fragmentary view of the driven shaft illustrated in connection with the gear wheel which communicates motion thereto, and Fig. 5 is a detailed side elevational view of the fan shaft and driven shaft showing the manner in which they are engaged.

Reference now being had to the drawings, wherein like numerals illustrate like parts throughout the several views, the numeral 10 indicates the funnel shaped casing having a depending cylindrical portion 11 extending therefrom in which is mounted means for drawing the insects within the trap. This means consists of a fan 12 mounted upon a shaft 13 which is journaled within a cross bar 14 mounted in the cylindrical member 11. A shaft 15 journaled within a cross bar 16 mounted on the extremity of the cylindrical member 11 frictionally engages the end of the shaft 13 as at 17. To provide means for propelling the last mentioned shaft, I provide a pair of brackets 18 within the cylindrical casing 11 which have journaled therein a driven shaft 19 and a drive shaft 20 which extend in parallel relation to each other. Mounted on the shaft 19 is a large gear 21 which meshes with a spiral gear 22 keyed to the shaft 15 and mounted upon the opposite shaft 20 is a gear 23 of greater diameter than the before mentioned gear and is adapted to mesh with a pinion 24 mounted on the shaft 19. These shafts 19 and 20 are mounted transversely in the frame, as more clearly shown in Fig. 3 and the shaft 20 extends beyond the casing and has mounted thereon an operating handle 25, whereby the fan 12 may be manually propelled, but in constructing a device greater in size than that shown in the drawings, a motor or other similar means of propulsion may be secured to the shaft 20 for operating the fan. Diagonally extending from one side adjacent the upper extremity of the cylindrical casing 11 is a tapered flue 26 which has a flange 27 formed around the outer extremity thereof. An insect catching bag 28 is detachably secured to the flue 26 as at 29 in any well known manner. This bag is of such construction that will properly hold the insects which have entered the same, but will allow the free escape of the air as it is drawn into the same, in view of the fact that the lower end or bottom of the bag is made of mesh or the like.

Mounted within the cylindrical casing 11 is a pair of inwardly extending lugs 30 having mounted thereon a wire screen 31. This screen is mounted on an angle so that when the fan rotates it will have a tendency to draw the insects to the fan, but the screen will prevent the insects from coming in contact therewith and direct the same into the flue 26 and then into the receptacle 28. A handle 32 is mounted on the funnel shaped portion of the casing 10, whereby the same may be easily carried from place to place.

It is obvious from this construction that as the gearing, as before described, is operated it will cause the fan 12 to rotate and as the shaft 15 is in frictional engagement with the shaft 13, the fan 12 will continue rotating through its momentum should the gearing be stopped.

It is to be further understood that other minor details of construction may be re-

Having thus fully described my invention, what I claim as new and desire to secure by Letters Patent, is:—

An insect trap including a funnel-shaped casing, a cylindrical element issuing from the apex of said element, a flue formed in said element and having communication with said casing, a screen arranged in said element having engagement with the inner side of said element below the orifice of said flue and inclined upwardly therefrom, and having engagement with said elements below the interconnection of said casing and said element, a cross bar mounted approximately midway the ends of said element, a shaft revolubly mounted in said cross bar, a fan carried on the upper end of said shaft, a second cross bar arranged on the extreme of said element and provided with an opening midway the ends thereof, a shaft the one end of which is journaled in said opening and the opposite end frictionally engaging with said fan shaft, a spiral gear formed on said second mentioned shaft, a drive shaft extending transversely in said element, a driven shaft arranged in parallelism to said drive shaft, a large gear keyed on said drive shaft and a pair of relatively smaller gears keyed on said driven shaft, the one of said smaller gears co-meshing with said drive shaft gear for communicating motion from said drive shaft to said driven shaft, and the other small gear of said driven shaft meshing with the spiral gear whereby to impart motion to said fan shaft, and a crank for operating said drive shaft.

WILLIAM HARRISON.

Witnesses:
J. M. PALMER,
W. J. HILL.